United States Patent [19]

Simpson et al.

[11] Patent Number: 5,011,217

[45] Date of Patent: Apr. 30, 1991

[54] UNIFIED FRAME/BODY ASSEMBLY FOR VEHICLE

[75] Inventors: Clark C. Simpson, Martin, Mich.; Paul C. Weirs, Lexington, Ky.

[73] Assignee: Clark Equipment Company, South Bend, Ind.

[21] Appl. No.: 489,735

[22] Filed: Feb. 27, 1990

Related U.S. Application Data

[63] Continuation of Ser. No. 244,288, Sep. 15, 1988, abandoned.

[51] Int. Cl.$^5$ .................. B62D 23/00; B60R 11/24
[52] U.S. Cl. ................... 296/203; 296/194; 296/198; 296/204; 293/129; 280/788
[58] Field of Search .............. 296/194, 198, 203, 204, 296/183; 293/102, 109, 120–122, 126, 127, 129, 132, 138; 280/787, 788

[56] References Cited

U.S. PATENT DOCUMENTS

| | | |
|---|---|---|
| 2,637,592 | 5/1953 | Karlby . |
| 2,711,341 | 6/1955 | Mills et al. . |
| 2,719,044 | 9/1955 | Walter . |
| 3,759,540 | 8/1973 | Olson ........................ 296/204 X |
| 3,907,356 | 8/1975 | Sien ........................... 296/204 |
| 4,027,913 | 6/1977 | Youngers et al. ......... 296/203 X |
| 4,457,555 | 7/1984 | Draper ...................... 296/30 X |
| 4,466,653 | 8/1984 | Hardsaki ................... 296/203 X |
| 4,711,467 | 12/1987 | Link et al. . |
| 4,763,948 | 8/1988 | Harasaki ................... 296/194 |

FOREIGN PATENT DOCUMENTS

| | | | |
|---|---|---|---|
| 500548 | 11/1954 | Italy ................... | 296/194 |
| 110575 | 5/1987 | Japan ................. | 296/194 |
| 678905 | 9/1952 | United Kingdom ... | 296/194 |
| 715108 | 9/1954 | United Kingdom ... | 296/204 |
| 750845 | 6/1956 | United Kingdom ... | 296/203 |
| 2073107 | 9/1981 | United Kingdom ... | 296/198 |

OTHER PUBLICATIONS

"Popular Science", Automotive Newsfront article, Sep., 1988, p. 18.

*Primary Examiner*—Dennis H. Pedder
*Attorney, Agent, or Firm*—King & Schickli

[57] ABSTRACT

A unified frame/body assembly is provided for a vehicle, such as a tow tractor. The reinforced center core of the tractor has a pair of longitudinal box-like body sections. Each body section includes a box beam with an integral extension panel. Substantially planar fenders structurally bridge between and connect the body sections to a wing at each end of a bumper member. The extension panel, fender and wing of the bumper form a substantially rigid quarter panel providing support for the vehicle through the suspension means of the vehicle. A pair of cantilever arms mount the suspension, preferably leaf springs, by attachment to the box beams with the distal end of the springs being connected to a mounting plate extending along the bottom of the bumper member. The quarter panel provides structural support between the body sections and the bumper member so as to provide an open space within the tractor that is substantially free of obstructions so as to allow a lowered profile and increased turning radius of the wheels of the tractor. The fender includes an inwardly extending lip along the upper margin so as to increase rigidity. The lower margin of the fender includes tabs and weldments are provided around the tabs to form the quarter panel. Preferably, strong structural material, such as 0.5" steel is used to provide the requisite support strength and for added weight to the tractor for increased friction to allow efficient handling of heavy loads.

13 Claims, 2 Drawing Sheets

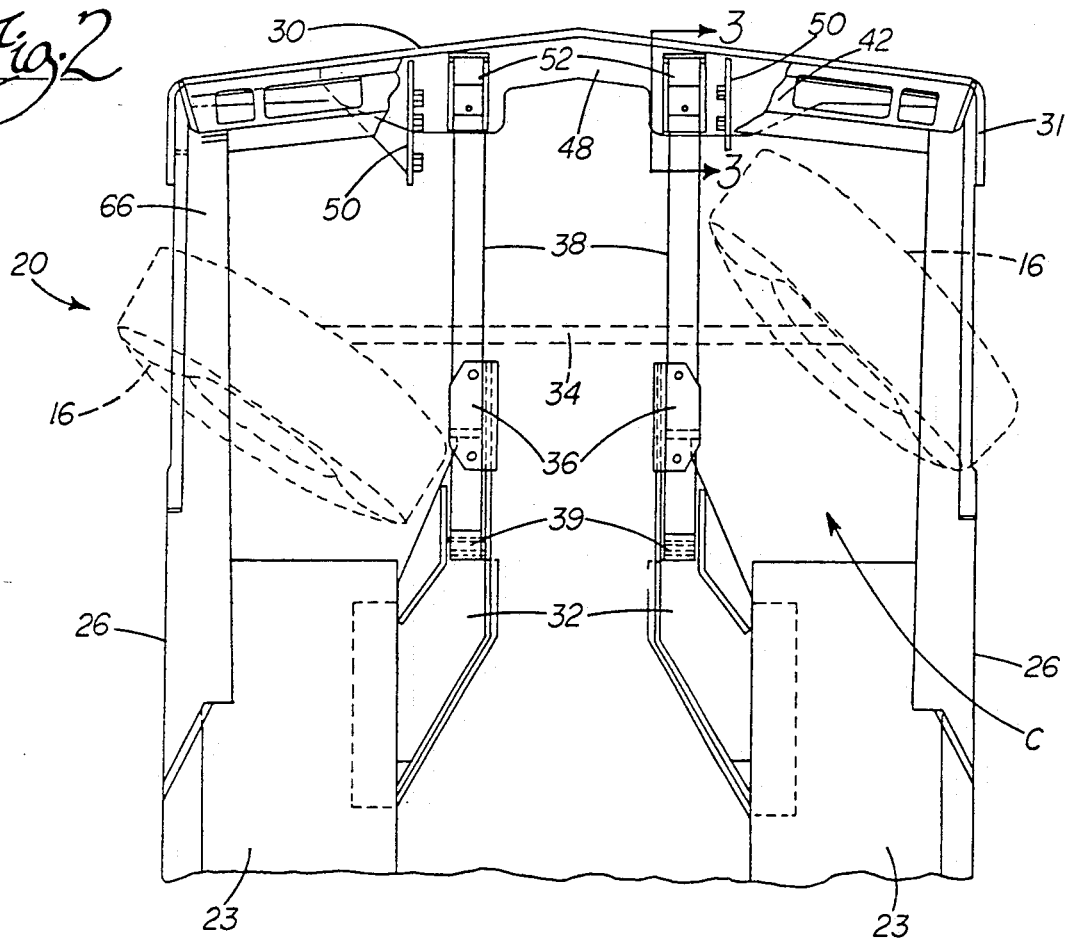
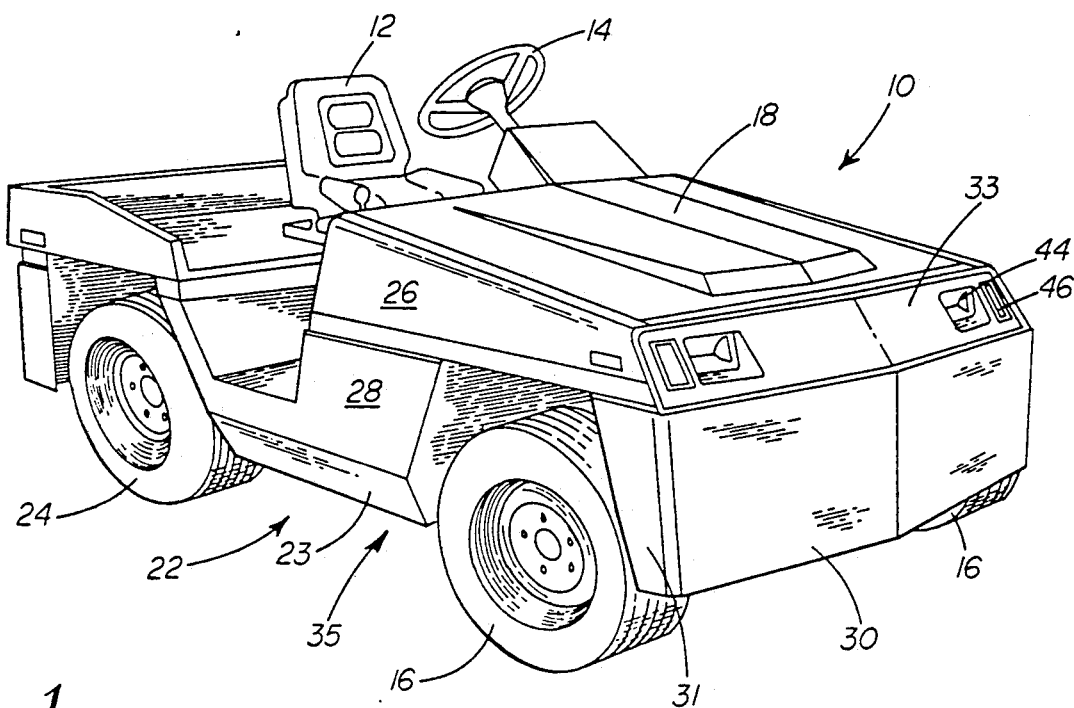

UNIFIED FRAME/BODY ASSEMBLY FOR VEHICLE

This is a continuation of application Ser. No. 244,288, filed Sep. 15, 1988, now abandoned.

TECHNICAL FIELD

The present invention relates generally to the field of vehicle engineering and, more particularly, to an improved frame/body assembly for mounting the engine, suspension and/or other components of a vehicle and totally supporting the weight of the vehicle.

BACKGROUND OF THE INVENTION

For many years, production vehicles have been almost exclusively constructed with a relatively lightweight skin of stamped sheet metal or formed fiberglass connected to an underlying main structural frame. Typically, the frame is fabricated of two spaced apart, longitudinally extending box beams connected together at intervals by a series of cross members.

While such a construction provides the necessary rigidity to form the vehicle frame to resist twisting and bending under heavy braking, cornering and accelerating loads, as well as for accommodating towing of other vehicles or the like, it also inherently includes a number of drawbacks.

More specifically, in such a design, the engine and/or other components are necessarily mounted overlying the cross members connecting the longitudinal beams. This results in a relatively high center of gravity, as well as a high hood line which reduces driver visibility. Especially in certain utility vehicles, such as tow tractors of the type used in airports, the higher profile restricts clearances around and under aircraft, and in other tight places. In more conventional vehicles, the high hood line also degrades the aerodynamics of the vehicle. Because of this, the overall operating efficiency of any type of vehicle is reduced when the separate vehicle frame is required.

In an attempt to satisfactorily address these and other problems, vehicles of unibody construction have been developed. An example of an early unibody vehicle may be found in the U.S. Pat. No. 2,637,592 to Karlby. In this unibody construction, the relatively thin sheet metal is formed into a plurality of shell-like sections that are stacked together to form the vehicle. The reinforcement provided by the mating shells, serve to mount the mechanical components of the vehicle, support the weight of the vehicle and serve as well to provide the outer skin. In this way, it is proposed that relatively heavy, separate frame members, including the longitudinal beams and cross members may be eliminated. By eliminating these bulky frame members from the construction, the engine theoretically may be placed lower within the vehicle. Thus, the overall hood line of the vehicle may also be lowered. This concept serves to improve driver visibility and maneuverability, as well as the overall aerodynamics of the vehicle. Further, by eliminating all or most of the relatively heavy frame members from the vehicle, the overall weight of the vehicle is theoretically reduced. As a result, the operating efficiency of the vehicle can be said to be increased.

Still, it should be appreciated that further improvement in vehicle design over this unibody construction and the prior art is possible. More particularly, the stacked shells of these previous unibody designs can be recognized as occupying a significant amount of space. This is especially important in the front of the vehicle since like the longitudinal beams on framed vehicles, the body members unduly restrict or limit access to the engine and other components for routine service and repair work. The clearance for the tires may also be limited. As such, suspension travel must by necessity be shortened to the general detriment of the overall quality of the ride. Likewise, the restriction in clearance limits the sharpness of the turns of the vehicle. The only solution to these problems is to raise the vehicle and provide a wider front track, respectively. These design changes, of course, go against the other desirable criteria recognized by those skilled in the art.

In addition to the above shortcomings, it will also be appreciated that the use of a number of overlapping shells is a relatively expensive way to produce a vehicle. Typically, the shells are stamped from numerous sheet metal pieces that must be held in complicated jigs for assembly and welding. Each of the weld points that is enclosed between the shells is subject to substantial stress as the vehicle is placed under loading. Also, moisture is likely to enter and become trapped in between the shells. This leads to rust and corrosion problems, much like appear in many vehicles in the industry today. A need, therefore, is clearly identified for an improved unified frame/body assembly eliminating the stacked shell concept in favor of a simplified and more economical design.

SUMMARY OF THE INVENTION

Accordingly, it is a primary object of the present invention to provide a frame/body assembly overcoming the limitations and disadvantages of the prior art.

Another object of the present invention is to provide a frame/body assembly allowing a lower engine placement, and thus the production of a vehicle with a lower hood profile for better driver visibility and maneuverability in tight places, as well as enhanced aerodynamics.

Yet another object of the present invention is to provide a unified frame/body assembly by eliminating frame components per se in the front and/or rear of the vehicle.

Still another object of the present invention is to provide a vehicle that unifies the frame/body assembly to provide more spacious interior space, such as in the engine compartment for easier access and service.

A further object of the present invention is to provide a vehicle wherein the quarter panel including the fender of the vehicle forms an essential component of a unique combined frame and body.

Still a further object of the present invention is to provide a vehicle having fewer component parts for more economical production and maintenance.

Still another object of the present invention is to provide a vehicle using beam reinforced body sections forming a central vehicle core and combined with load supporting quarter panels to provide a unified frame/body assembly.

Another object of the present invention is to provide a unified frame/body assembly of the concept described wherein the quarter panels include substantially planar fenders forming a bridge between the center core and the bumper of the vehicle with the suspension and other components mounted and fully supported between the center core and the bumper.

Additional objects, advantages and other novel features of the invention will be set forth in part in the description that follows and in part will become apparent to those skilled in the art upon examination of the following, or may be learned with the practice of the invention. The objects and advantages of the invention may be realized and attained by means of the instrumentalities and combinations particularly pointed out in the appended claims.

Thus, to achieve the foregoing and other objects and in accordance with the purposes of the present invention as described herein, an improved unified frame/body assembly is provided. In the preferred embodiment illustrated, a vehicle, such as a tow tractor, has the suspension and other components housed and supported in a unique manner. Specifically, this is accomplished without underlying frame beams and cross members, and without stacked shells of the old unibody construction.

The assembly includes a reinforced center core or mid-section of the vehicle having a pair of longitudinal box-like body sections. Each body section comprises a box beam extending along and forming the rocker panel with extension panels extending upwardly at both ends and forming a portion of the side quarter panels. A pair of substantially planar fenders bridge between and connect the body sections directly to a front or rear bumper member. In the present application, the description will focus on the invention disclosed as applied to the front of the vehicle, although it is to be understood that the same principles apply when the concepts are used for the rear of the vehicle.

Together, the spaced body sections with the integral box beams, the quarter panels and the bumper define a relatively spacious engine compartment in between, which is free of obstructions, such as frame components, as required in the prior art. As such, the engine is positioned lower in the open space or compartment just above the front axle so as to provide a lower center of gravity. This positioning accommodates a lower hood line so as to allow the driver a more complete field of view from which to operate the vehicle and better maneuver the vehicle around and under obstacles, such as aircraft. The additional space provided under the hood also serves to improve the serviceability of the engine and other components. As a result, routine maintenance, such as changing of spark plugs, lubrication, oil change and the like, is more easily performed.

In addition to the bumper member, the center body sections and the load bridging quarter panels, the frame/body assembly advantageously includes a pair of engine support arms. One engine support arm is connected to the forward end of each box beam of the center body section. The support arms converge toward one another in the engine compartment with the forward ends terminating directly behind the front axle. The engine is mounted in a cantilever fashion on the support arms utilizing conventional rubber or hydraulic mounts to absorb vibration, as is known in the art.

The front suspension, preferably leaf springs, is supported between the support arms and the bumper member. More specifically, each support arm includes a bracket for receiving the rear end of the corresponding leaf spring. A mounting plate extends along the bottom of the bumper member in a substantially horizontal plane. This mounting plate carries a pair of socket mounts designed to receive the front end of the leaf springs. Thus, the springs bridge between the engine support arms and the bumper member. Consequently, the entire weight of the vehicle is supported through the bumper member, quarter panel including the planar fender, center body section and integral box beam.

The planar fender, which forms an important part of the inventive concept of the present invention, is preferably welded in position at the top of the bumper member in the front and along the vertical extension panel on the center body section in the rear. The entire quarter panel, consisting of the extension panel, the fender, and a wing of the bumper extends in a substantially vertical plane. When formed of strong structural material, such as steel having a thickness of substantially 0.5", it has been found that the requisite support strength is provided. The quarter panel also advantageously forms a portion of the skin of the vehicle extending around and just outboard of the wheels so that the overall appearance is not unlike conventional tractors. Advantageously, by eliminating all frame members other than the engine support arms in the area between the bumper member and the center core of the vehicle, an exceptionally large wheel well with maximum clearance for sharp angled turning is provided. This is another significant benefit in, for example, a tow tractor which must move around aircraft and other equipment in an airport setting.

The extra space also lends itself to the capability of providing extra suspension travel while still maintaining a relatively low profile. Such a feature is particularly attractive in a vehicle where both improved visibility and shock absorption are desired.

Preferably, the planar fender of a quarter panel includes an inwardly extending lip along the upper margin. This lip serves to increase the rigidity of the fender. The exposed edge of the fender faces toward the edge of the hood providing a conventional finished look.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated and forming a part of the specification, illustrates several aspects of the present invention, and together with the description serves to explain the principles of the invention. In the drawing:

FIG. 1 is a perspective view of a tow tractor equipped with the frame/body assembly of the present invention;

FIG. 2 is a cut-away top view of the front portion of the vehicle with the hood, engine and other components removed and the wheels and axles shown in phantom lines for clarity;

Figure 3:
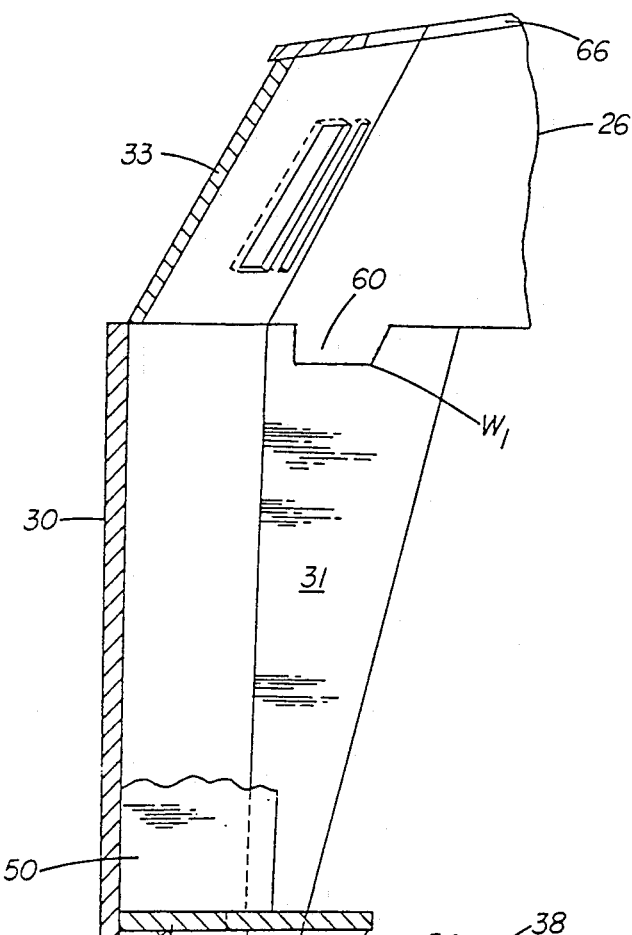
FIG. 3 is a cross-sectional view through the front bumper member taken along line 3—3 of FIG. 2.

Reference will now be made in detail to the present preferred embodiment of the invention, an example of which is illustrated in the accompanying drawing.

DETAILED DESCRIPTION OF THE INVENTION

Reference is now made first to FIG. 1 showing a tow tractor 10 incorporating a unified frame/body assembly 20 of the present invention. As is known in the art, the tow tractor 10 is equipped with a seat 12 for supporting a driver/operator (not shown). The driver is able to control the direction of travel of the tow tractor 10 by means of a steering wheel 14 which is connected through a conventional steering linkage to the front wheels 16.

As should be appreciated from viewing FIG. 1, the tow tractor 10 is provided with a relatively low hood line with the hood 18 raked downwardly as it extends toward the front of the vehicle. Advantageously, this feature which is a result of the present invention, provides the driver with substantially improved frontal viewing capability. Thus, the tow tractor 10 can be carefully and more easily guided and maneuvered around and under aircraft and related equipment.

Figure 4:
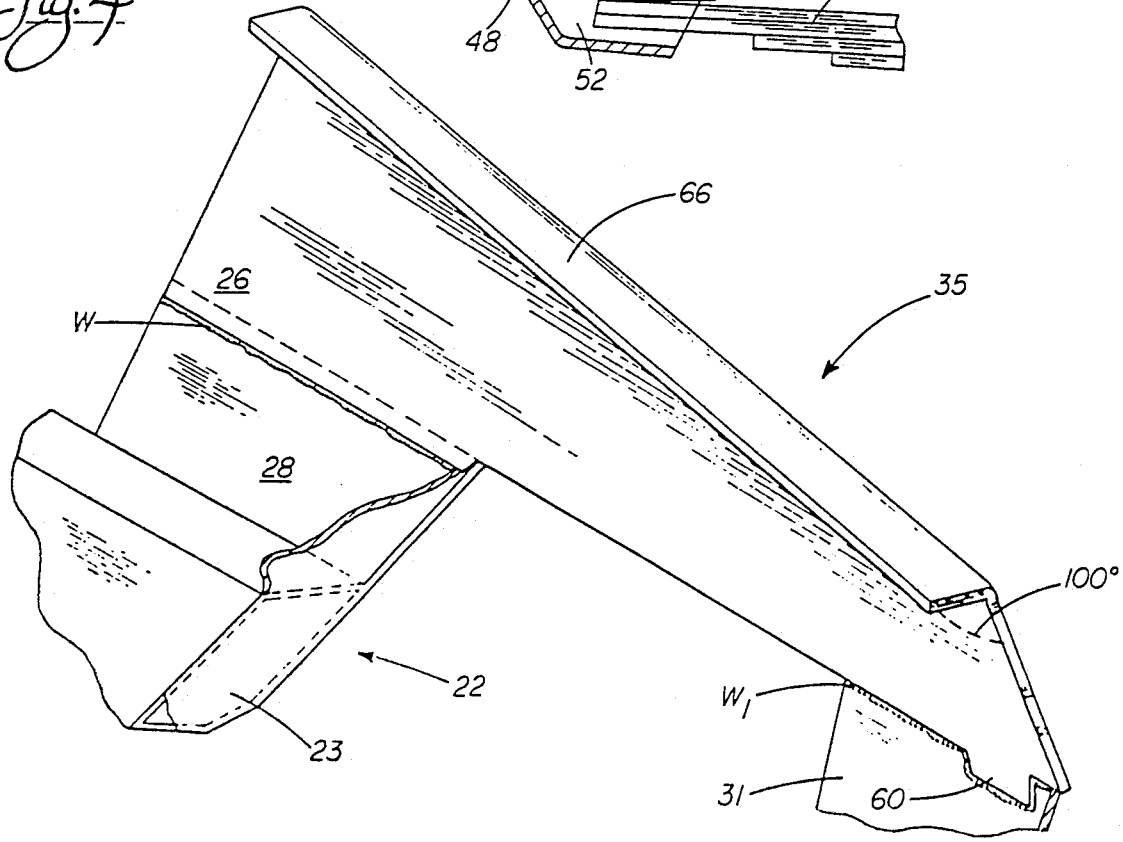
FIG. 4 is a perspective view of a quarter panel of the frame/body assembly with the center body section and bumper wing cut away for clarity.

As shown in FIGS. 1, 2 and 4, the frame/body assembly 20 includes a reinforced vehicle core or midsection including a pair of center body sections 22. Each body section 22 includes an enclosed box beam 23 that serves as the main reinforcement component of the vehicle. With one box beam extending longitudinally along each side of the vehicle 10, the center core of the vehicle is made exceptionally strong and serves as the connecting location for the front and rear of the vehicle. As will be apparent from the description below, the unified frame/body concepts of the present invention can be utilized extending to form either the front or the rear of a vehicle, which can either be a utility vehicle or a more conventional automobile or truck. This detailed description will be limited to the structure of the invention as it would form the front of the vehicle; it being understood that the same principles would apply when utilizing the concepts in the rear.

The body section 22 is connected to a substantially planar fender 26 through an extension panel 28 formed integrally with the box beam 23 (see FIGS. 1 and 4). The extension panel 28 is likewise planar in construction so as to substantially match the fender 26. At the front, the fender 26 is connected to the top of the front bumper member 30. The connection is principally to a wing 31. Preferably, the connection of extension panel 28 and the wing 31 is by conventional weldments W, W₁ (see FIG. 4).

A pair of support arms 32 are provided extending upwardly from the two box beams 23, as illustrated in FIG. 2. Each support arm 32 is thus rigidly connected to the center core of the vehicle. The support arm 32 extends forwardly in a cantilever fashion into the interior open space or engine compartment C. The distal ends of the arm 32 is just behind front axle 34 of the vehicle.

The support arms are angled or tilted toward the middle of the engine compartment C and together serve to cradle the engine (not shown) through mounting brackets 36. Rubber and/or hydraulic mounts (not shown) may be provided on the brackets 36 to dampen the vibrations from the engine.

As should be appreciated, the front suspension of the vehicle 10, including a pair of leaf springs 38, is also mounted by the support arms 32. In accordance with the present invention, the front end or distal end of each leaf spring 38 is connected to the front bumper member, rather than to a separate frame member as is generally conventional in the prior art. Thus, the entire weight of the front of the vehicle 10 is advantageously carried by the box beams 23 of the center core of the vehicle and the front bumper member 30.

To accomplish the result just described requires that a quarter panel 35 at each of the corners of the vehicle thus support the weight of the vehicle. This is done in the present invention by forming the quarter panel 35 from the extension panel 28 on the center section 22, the fender 26 and the wing 31 of the bumper member 30. Each of these components of the quarter panel 35 is substantially planar and is designed in a unique fashion to provide the full load support required. As a result, the engine compartment C remains clear of all obstacles, except for the springs 38 and the axle 34. This allows maximum positioning room for the engine, steering and other components of the vehicle, while at the same time allowing maximum turning of the front wheels 16 (see FIG. 2).

As best illustrated in FIG. 1 and in FIG. 3, the front bumper member 30 in addition to the wing 31 includes a slanted upper portion 33 to complement the sloped hood 18 and, thus, maximize the visibility in the forward direction. The upper portion also includes openings for headlights and parking lights 44, 46. Around the outer perimeter of the upper portion 33 adjacent these openings, the fender 26 is welded in order to provide additional securement to the front bumper member 30.

The front bumper member 30 also includes an elongated mounting plate 48 extending along the bottom in a substantially horizontal plane (see FIG. 2 and also FIG. 3). The mounting plate 48 extends a short distance back toward the engine compartment C and adds substantial additional rigidity to the bumper member 30. As shown in FIG. 2, the mounting plate 48 extends substantially across the entire width of the tow tractor 10. Vertically oriented gusset plates 50 are also welded in position on the back side of the bumper member 30 in order to provide further structural support and stiffness. Thus, the bumper member 30 is made very rigid to perform its function of serving as a primary frame component in the unified frame/body scheme of the present invention, as well as to resist impact forces that occur if the vehicle 10 inadvertently bumps into a barrier or the like.

In order to retain the distal or forward end of the spring 38, a socket 52 is provided (see FIGS. 2 and 3). A bearing block 54 forms a part of the socket 52 by which the load is actually transmitted to the spring 38. In a condition of jounce, the socket 52 retains the front of the spring 38, as can best be visualized in FIG. 3.

As best shown in FIG. 4, the welds W, W₁ are preferably made along the inside surface of the quarter panel 35. The fender 26 includes a depending tab 60 for providing additional weld area for reinforcing this connection to the wing 31. The overlap of the fender 26 at the rear forms a similar full length depending tab for connection to the extension panel 28. When thus properly assembled and welded, the quarter panel 35 serves as an exceptionally strong structural bridge connecting the front bumper member 30 to the box beam 23 of the center core of the vehicle.

In order to provide the necessary strength to support the front/rear of the vehicle, the quarter panel 35, including the front bumper member 30, the fender 26 and the extension panel 28 are constructed from heavy gauge material. In the instance of using the concepts for a tow tractor, it has been found that heavy gauge structural steel, having a thickness of at least 0.5″ is the best overall choice. This material is readily available at relatively low cost, while at the same time offering the requisite rigidity to carry out the function of forming the structural bridge between the center core 22 and the bumper member 30. Also, using the steel as the material, provides the weight that is necessary for the tow tractor 10 to gain maximum frictional engagement with the ground to handle heavy loads, such as towing an aircraft or related equipment.

Adding additional rigidity to the structure of the quarter panel 35, the fender 26 is provided with an integral angled lip 66 along its upper margin. This lip 66 in the preferred embodiment shown forms an included angle of between substantially 90° and 100° with respect to the fender 26. This lip 66 serves to greatly increase the structural strength so that the resistance to bending is enhanced. The edge of the fender is aligned with and merges with the opposed edge of the hood to assure against distracting from the aesthetic appearance of the tractor 10.

In summary, numerous benefits result from employing the concepts of the unified frame/body of the present invention. Advantageously, the engine and other components in the front of the vehicle 10 can be placed in a lower position assuring a lower center of gravity. A related advantage is that a lower profile across the hood 18 of the vehicle may be provided, and as a result, the view of the driver is improved. When the principles are applied to a conventional type vehicle, the overall aerodynamics is also a favorable result from this feature. By utilizing the unique combined frame/body functions of the quarter panel 35 including the substantially planar components, the tow tractor is provided with an engine compartment C of substantially increased size. This feature allows for improved access to the engine and other components, thereby greatly aiding serviceability of the tractor 10. This increased space also allows the wheels 16 to be cut at an exceptionally sharp angle (see FIG. 2) and, therefore, the tractor can be operated in tight situations. As such, manueverability is significantly enhanced, which is a particularly important advantage in a tow tractor 10 of the type used around and under aircraft at an airport.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A unified frame/body assembly for supporting the weight of a vehicle with suspension means and connected to ground engaging wheels, comprising:

a reinforced center body section;
flexible suspension means;
a bumper member;
means for mounting the flexible suspension means to said body section, both said reinforced center body section and said mounting means having a forward terminus spaced from said bumper member;
means for connecting said flexible suspension means to said bumper member so that said flexible suspension means extends directly between and bridges said mounting means of said body section and said bumper member; and
quarter panel means and hood means structurally bridging between said body section and said bumper member.

2. The unified frame/body assembly of claim 1, wherein said center body section includes a longitudinal box beam, said quarter panel means being directly connected to said beam.

3. The unified frame/body assembly of claim 2, wherein said mounting means comprises a cantilever arm supported by said box beam and extending into an open space.

4. The unified frame/body assembly of claim 3, wherein said frame/body assembly forms the front end of said vehicle including two body sections,, and two quarter panels and two cantilever arms adapted to support an engine for said vehicle.

5. The unified frame/body assembly of claim 1, wherein said suspension connecting means includes a mounting plate extending in a substantially horizontal plane along the bottom of said bumper member.

6. The unified frame/body assembly of claim 5, wherein said mounting plate extends across substantially the entire width of said vehicle to provide additional rigidity to said assembly.

7. The unified frame/body assembly of claim 1, wherein said quarter panel means is substantially planar and includes a fender and forms a portion of the outer skin of the vehicle.

8. The unified frame/body assembly of claim 7, wherein said fender includes an inwardly extending lip along an upper margin so as to increase rigidity.

9. The unified frame/body assembly of claim 8, wherein said lip is formed with an included angle of approximately 90°–100°.

10. The unified frame/body assembly of claim 9, wherein said quarter panel means is fabricated of low carbon structural steel having a thickness of substantially 0.5 inch.

11. The unified frame/body assembly of claim 2, wherein said reinforced body section includes an integral extension panel on said box beam, there being further provided a fender, and a wing included as a portion of said bumper, said panel, fender and wing being substantially planar and connected together to form said quarter panel means.

12. The unified frame/body assembly of claim 1 wherein said flexible suspension means is a leaf spring.

13. A unified frame/body assembly for supporting the weight of a vehicle with suspension means and connected to a ground engaging wheels, comprising:

a reinforce center body section including a longitudinal box beam;
flexible suspension means;
a bumper member;
means for mounting the flexible suspension means to said body section, both said reinforced center body section and said mounting means having a forward terminum spaced from said bumper member;

means for connecting said flexible suspension means to said bumper member so that said flexible suspension means extends directly between the bridges said mounting means of said body section and said bumper member; and said assembly further including an integral extension panel on said box beam, a fender and a wing included as a portion of said bumper member, said extension panel, fender and wing being connected together by tabs provided on a lower margin of said fender for mating with said extension panel and said wing and weldments extending around said tabs so as to form a substantially planar quarter panel structurally bridging between said body section and said bumper member so as to support the weight of the vehicle through said flexible suspension means.

* * * * *